United States Patent
Nagase et al.

(10) Patent No.: US 11,519,769 B2
(45) Date of Patent: Dec. 6, 2022

(54) FLOW RATE CONTROL SYSTEM AND FLOW RATE MEASUREMENT METHOD

(71) Applicant: FUJIKIN INCORPORATED, Osaka (JP)

(72) Inventors: Masaaki Nagase, Osaka (JP); Satoru Yamashita, Osaka (JP); Masayoshi Kawashima, Osaka (JP); Masahiko Takimoto, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 72 days.

(21) Appl. No.: 17/264,173

(22) PCT Filed: Jul. 16, 2019

(86) PCT No.: PCT/JP2019/027880
§ 371 (c)(1),
(2) Date: Jan. 28, 2021

(87) PCT Pub. No.: WO2020/026784
PCT Pub. Date: Feb. 6, 2020

(65) Prior Publication Data
US 2021/0310844 A1    Oct. 7, 2021

(30) Foreign Application Priority Data

Jul. 30, 2018    (JP) .............................. JP2018-143005

(51) Int. Cl.
*G01F 1/88*    (2006.01)
(52) U.S. Cl.
CPC ...................................... *G01F 1/88* (2013.01)
(58) Field of Classification Search
None
See application file for complete search history.

(56) References Cited

U.S. PATENT DOCUMENTS

| | | | |
|---|---|---|---|
| 2013/0186471 A1 | 7/2013 | Nagase et al. | |
| 2014/0013838 A1* | 1/2014 | Sawada | G01F 1/86 |
| | | | 73/203 |

(Continued)

FOREIGN PATENT DOCUMENTS

| | | |
|---|---|---|
| JP | 2006337346 A | 12/2006 |
| JP | 2012032983 A | 2/2012 |

(Continued)

OTHER PUBLICATIONS

International Search Report issued in PCT/JP2019/027880; dated Oct. 15, 2019.

*Primary Examiner* — Paul M. West
*Assistant Examiner* — Mark A Shabman
(74) *Attorney, Agent, or Firm* — Studebaker & Brackett PC

(57) ABSTRACT

A control unit 3 of a flow rate control system 1 comprises: a recording unit 31 for recording measured values of a pressure sensor P and a temperature sensor T, a storage unit 32 for storing volume data between a first valve V1 and a second valve V2 corresponding to the measured value of the pressure sensor P, and an arithmetic unit 33 for calculating a flow rate based on a first pressure value P1 and a first temperature value T1 measured after opening the first valve V1 and the second valve V2 to flow a gas and then closing the first valve V1 and the second valve V2 simultaneously in a state where the gas is flowing; a second pressure value P2 and a second temperature value T2 measured after opening the first valve V1 and the second valve V2 to flow a gas, closing the second valve V2 in a state where the gas is flowing, and then closing the first valve V1 after a predetermined time Δt has elapsed; and a volume value V between the first valve V1 and the second valve V2 which corresponds to the second pressure value P2.

8 Claims, 4 Drawing Sheets

(56) References Cited

U.S. PATENT DOCUMENTS

2019/0094847 A1   3/2019  Nagase et al.
2020/0011720 A1   1/2020  Nagase et al.

FOREIGN PATENT DOCUMENTS

| JP | 2012-141254 A | 7/2012 |
| JP | WO2018147354 A1 | 12/2019 |
| KR | 10-2018-0080293 A | 7/2018 |

* cited by examiner

FLOW RATE CONTROL SYSTEM AND FLOW RATE MEASUREMENT METHOD

TECHNICAL FIELD

The present invention relates to a flow rate control system and a flow rate measurement method applied to a gas supply apparatus used in a semiconductor manufacturing equipment, a pharmaceutical manufacturing equipment, a chemical plant, or the like.

BACKGROUND OF INVENTION

In a semiconductor manufacturing equipment, a chemical plant, or the like, it is required to supply gas with high accuracy. As a gas flow rate control device, a mass flow rate controller (thermal mass flow rate controller) or a pressure-type flow rate control system is known.

In these flow rate control systems, the flow rate must be managed with high accuracy, so it is preferable to perform the confirmation and calibration of the flow rate accuracy at any time as necessary. As a flow rate measurement method, generally a flow rate measurement by a build-up method is used. The build-up method is a method of measuring the flow rate by detecting a pressure per unit time flowing into a known capacity (build-up capacity).

By flowing gas into a pipe or a tank having a constant volume (V) provided downstream of the flow rate controller, and measuring the pressure rise rate ($\Delta P/\Delta t$) and temperature (T) at that time, the build-up method obtains a flow rate Q from, for example, $Q=22.4\times(\Delta P/\Delta t)\times V/RT$, where R is a gas constant.

Patent Document 1 describes a gas supply apparatus in which an example of the flow rate measurement using the build-up method is disclosed, and Patent Document 2 discloses a flow rate calculation method relating to a calibration method of a flow rate controller using the build-up method.

PRIOR-ART DOCUMENT

Patent Literature

Patent Document 1: Japanese Patent Application Laid-Open No. 2006-337346
Patent Document 2: Japanese Patent Application Laid-Open No. 2012-32983

SUMMARY OF INVENTION

Problem to be Solved by Invention

In the conventional build-up method, the pressure is detected during sending gas into a pipe or a tank having a constant build-up capacity, when the range of the flow rate to be measured is small, there is no need to change the build-up capacity by considering the build-up pressure constant (e.g., 100 Torr).

However, usually, it is desired to provide a plurality of flow rate controllers arranged in parallel and to supply a fluid in different flow rates to chambers. In such a case, in the flow rate measurement by the build-up method, the range of the flow rate to be measured depends on the flow rate controller, for example, it may be required to perform the flow rate measurements in a range such as 1 sccm to 2000 sccm. When measuring 2000 sccm, if the build-up pressure is set as 100 Torr, it takes only several seconds to raise the pressure to the build-up pressure, however, when measuring the flow rate of a small flow rate such as 1 sccm, the time needed to raise the pressure may be several hours, if the build-up pressure is set the same 100 Torr as that of 2000 sccm.

Because it is not realistic in the actual device to take such a long time to raise the pressure in this manner, in order to lower the build-up pressure so as to shorten the pressure rising time, for example, when measuring the flow rate of 1 sccm, the build-up pressure is lowered to 4 Torr to eliminate the problem of the pressure rising time. When the build-up pressure changes, in the case that a pressure gauge for measuring the build-up pressure is capacitance type having a diaphragm inside, the deformation amount of the diaphragm varies, and in the case of a strain gauge type pressure gauge, the internal deflection occurs, and the volume related to the part changes by a small amount. Then, it was found that a problem occurs in the case of a small volume, such as using a pipe as the build-up volume, the fluctuation of the volume in the pressure gauge becomes a matter that cannot be ignored for the entire build-up volume, and affects the flow rate measurement results.

In view of the above problems, the present invention aims to provide a flow rate control system and a flow rate measurement method capable of accurately measuring a flow rate even if changing a build-up pressure accompanying a change in the flow rate to be measured.

Means for Solving Problem

In order to achieve the above object, the flow rate control system according to an embodiment of the present invention comprises:

a first valve provided downstream of a flow rate controller; a flow rate measurement device provided downstream of the first valve, the flow rate measurement device having a pressure sensor, a temperature sensor, and a second valve provided downstream of both sensors: and a control unit for controlling an opening/closing operation of the first valve and the second valve, wherein the control unit includes: a recording unit for recording the measured values of the pressure sensor and the temperature sensor;

a storage unit for storing a volume value from the first valve to the second valve corresponding to the measured value of the pressure sensor, and an arithmetic unit for calculating a flow rate based on a first pressure value and a first temperature value measured after opening the first valve and the second valve to flow gas and closing the first valve and the second valve simultaneously in a state where the gas is flowing; a second pressure value and a second temperature value measured after opening the first valve and the second valve to flow the gas, closing the second valve in a state where the gas is flowing, and then closing the first valve after a predetermined time period has elapsed; and a volume value from the first valve to the second valve corresponding to the second pressure value obtained from the storage unit.

According to the above flow rate control system, it is possible to prevent the influence to the flow rate calculation due to changes in the build-up capacity caused by variations in the second pressure value which is the build-up pressure.

Further, in order to achieve the same object, the flow rate measurement method according to an embodiment of the present invention is performed in a flow rate control system comprising: a first valve provided downstream of a flow rate controller; a flow rate measurement device provided downstream of the first valve, the flow rate measurement device having a pressure sensor, a temperature sensor, and a second valve provided downstream of both sensors; and a control unit for controlling the opening/closing operation of the first valve and the second valve, the flow rate measurement method comprising:

a first step of opening the first valve and the second valve to flow a gas, then closing the first and second valves simultaneously in a state where the gas is flowing, and measuring a pressure and a temperature thereafter;

a second step of opening the first valve and the second valve to flow a gas, then closing the second valve in a state where the gas is flowing, then closing the first valve after a predetermined time period has elapsed, and measuring a pressure and a temperature thereafter; and a third step of calculating a flow rate on the basis of the pressure and temperature measured in the first step, the pressure and temperature measured in the second step, and a build-up volume that varies corresponding to the pressure measured in the second step.

According to the flow rate control system and the flow rate measurement method relating to the embodiments of the present invention, it is possible to perform stable flow rate calculation even if changing the pressure measured in the second step which serves as the build-up pressure.

Moreover, in this case, the flow rate control system may include a third valve, which is in a normally open state, provided downstream of the flow rate controller and the first valve, but upstream of the pressure sensor and the temperature sensor, after measuring the pressure and the temperature in the second step, a pressure measured after opening and then closing the second valve for a short time while closing the third valve, and a pressure measured after opening the third valve in a state where the second valve is further closed, may be used for the flow rate calculation in the third step. This enables the elimination of the influence of the pipe temperature.

Effect of Invention

The flow rate control systems and the flow rate measurement method according to the present invention is capable of measuring a wide range of flow rates, e.g., flow rates of 1 sccm to 2000 sccm, in a short time period and with high accuracy.

DETAILED DESCRIPTION OF EMBODIMENTS

Hereinafter, embodiments of the present invention will be described in detail with reference to the drawings. It should be noted that the following embodiments are essentially preferred examples and are not intended to limit the scope of the present invention, its applicable objects, or its application.

Embodiment 1

Figure 1:
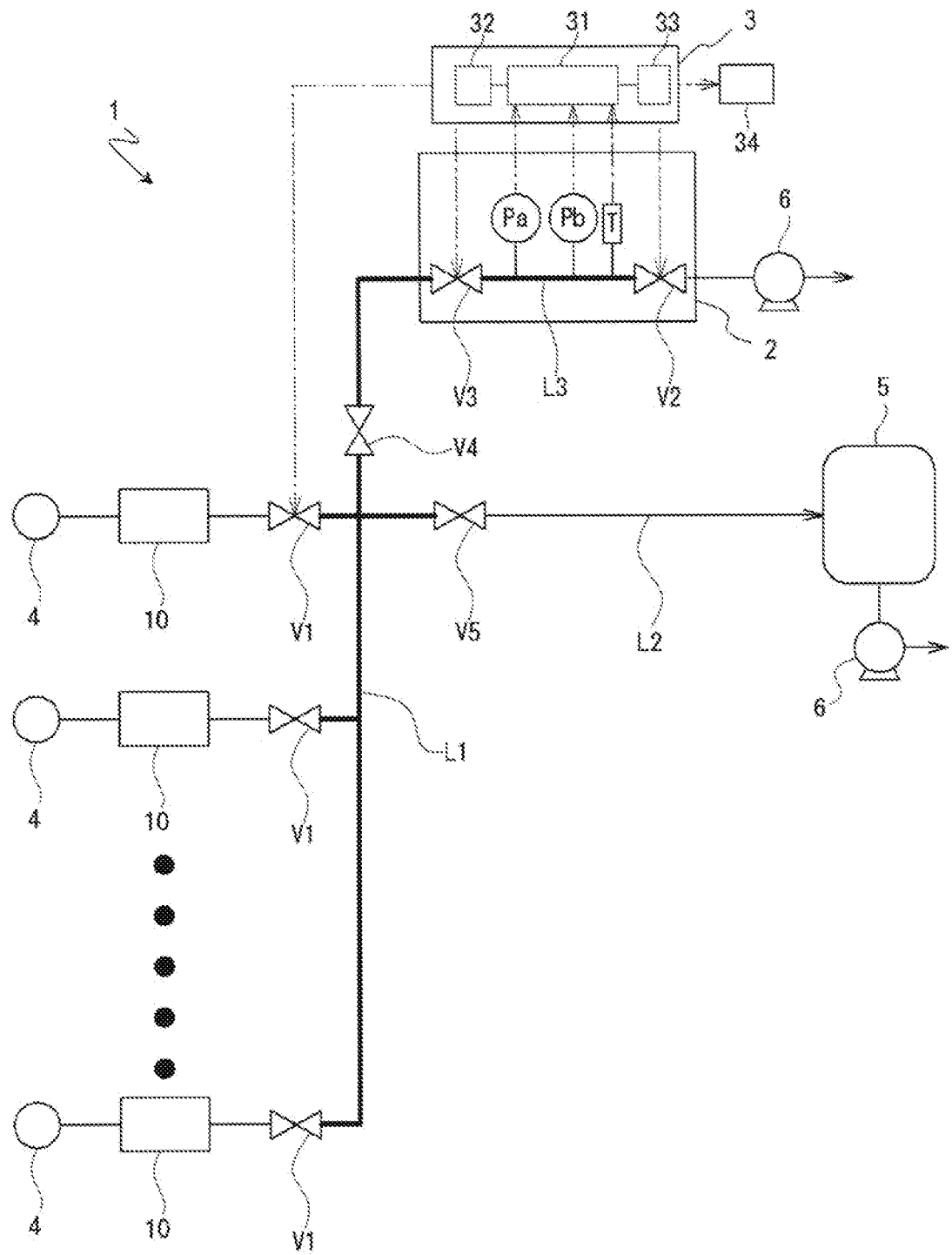
FIG. 1 is a schematic diagram showing a configuration of a flow rate control system according to an embodiment of the present invention.

The embodiment 1 is a flow rate control system according to the present invention. As shown in FIG. 1, a flow rate control system 1 comprises first valves V1 provided downstream of flow rate controllers 10; a pressure sensor P provided downstream of the first valves V1 (as the example shown in the Figure, since two pressure sensors are provided, pressure sensor Pa and Pb are collectively referred to as the pressure sensor P), a temperature sensor T, and a flow rate measurement device 2 having a second valve V2 provided downstream of the pressure sensor P and the temperature sensor T; and a control unit 3 for controlling the opening/closing operation of the first valves V1 and the second valve V2, wherein the control unit 3 includes a recording unit 31 for recording the measured values of the pressure sensor P and the temperature sensor T; a storage unit 32 for storing volume data from the first valves V1 to the second valve V2 corresponding to the measured value of the pressure sensor P; and a arithmetic unit 33 for calculating a flow rate on the basis of a first pressure value P1 and a first temperature value T1 measured after opening a first valve V1 and the second valve V2 to flow a gas and then closing the first valve V1 and the second valve V2 simultaneously while the gas is flowing; a second pressure value P2 and a second temperature value T2 measured after opening the first valve V1 and the second valve V2 to flow the gas then closing the second valve V2 while the gas is flowing, and closing the first valve V1 after a predetermined time Δt has elapsed; and a volume value V from the first valve V1 to the second valve V2 corresponding to the second pressure value P2. Moreover, besides that one of the pressure sensor Pa and the pressure sensor Pb is used for high pressure, and the other functions as low pressure, pressor gauges of the same range may be attached and configured to be used for double-checking. In addition, the number of pressure sensors is 2 or more, but it does not matter if only one is used.

Further, International Publication No. 2018/147354 by the applicant discloses a method of calculating flow rate on the basis of the first pressure value P1 measured after closing the first valve V1 and the second valve V2 simultaneously as described above, and the second pressure value P2 measured after closing the first valve P1 after a predetermined time Δt has elapsed after closing the second valve V2. According to this method, an amount of substance (molar number) of the gas at the time of sealing when simultaneously closing the valves can be obtained from the first pressure value P1. By subtracting this from the amount of substance of the gas flowing in the conventional buildup method, it is possible to reduce the line dependence of the flow rate to be measured.

A gas supply source 4 is connected to the upstream side of the flow rate controller 10. As shown in FIG. 1, the flow rate control system 1 of the present embodiment is configured so as to supply the gas from a plurality of gas supply sources 4 to a process chamber 5, such as a semiconductor manufacturing equipment, at a flow rate controlled by the flow rate controllers 10 provided for each of the gas supply sources 4 respectively. Although the flow rate of a fluid controlled by the respective flow rate controllers 10 may be the same flow rate, in the present embodiment, the respective flow rate controllers 10 are configured to control flow rates in the range, for example, from 1 sccm to 2000 sccm or more.

Figure 4:
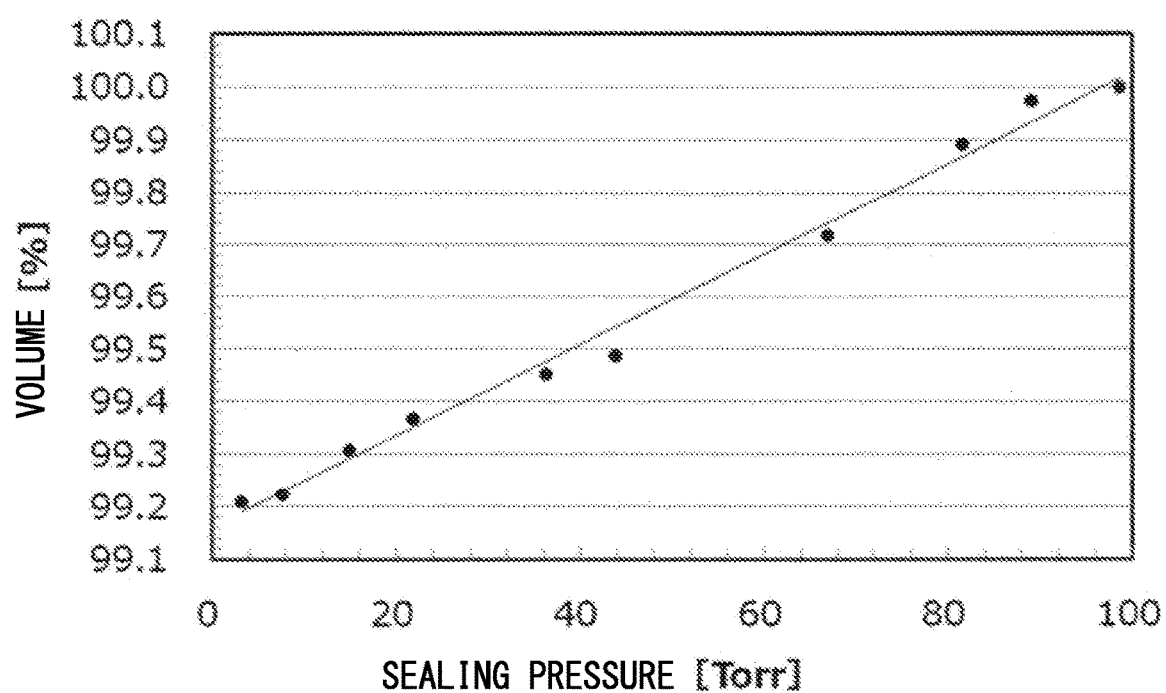
FIG. 4 is a graph showing the relationship between the build-up pressure and the build-up volume, showing the ratio of the volume at each build-up pressure when setting the volume as 100% at the time of the 100 Torr build-up pressure.

$Q=22.4\times((P2-P1)/(760\times R\cdot \Delta t))\times V/T$ (hereinafter referred to as the build-up general formula) is a calculation formula in a build-up method in an embodiment previously adopted by the applicant. In this previous embodiment, the flow rate is calculated assuming that the volume V is a constant. However, as shown in the graph of FIG. 4, when the value of P2 (sealing pressure in the graph) serving as the build-up pressure changes from 100 Torr to 4 Torr for example, the influence of the volume change due to the deformation of the diaphragms of the two pressure gauges for high pressure and low pressure becomes a non-negligible influence in the formula though it depends on the build-up volume. Note that in the above-mentioned build-up general formula, P2 is the above-mentioned second pressure value P2, P1 is the above-mentioned first pressure value P1, R is a gas constant, and Δt is a time period in the build-up process, from the time of closing the second valve V2 and the pressure starts to rise to the time of closing the first valve V1. The above formula is a general formula assuming T1=T2=T.

Referring again to FIG. 1, the flow rate control system 1 includes a gas supply line L1 to which a plurality of gas supply sources 4 can be connected; flow rate controllers 10 interposed in the gas supply line L1, first valves V1 provided downstream of each of the flow rate controllers 10, and a common gas supply line L2 provided downstream of the gas supply line L1. The flow rate measurement device 2 used in the flow rate control system 1 of the present embodiment shown in FIG. 1 is arranged to branch from the common gas supply line L2 leading to the process chamber 5, but it may be arranged so as to be interposed in the middle of the gas flow path leading from the gas supply source 4 to the process chamber 5 (see FIG. 3(a)). Then, supplying of fluid to the process chamber 5 in the flow rate control system 1 shown in FIG. 1, is performed by closing an on-off valve V4 provided in the flow path for branching the flow measurement device 2, opening an on-off valve V5 provided in the flow path leading to the process chamber 5, and opening any one of the first valves V1 of interest. However, in the case where the flow rate measuring device 2 has a third valve V3 upstream of the temperature sensor T and the pressure sensor P as shown in FIG. 1, the third valve V3 may be used instead of the on-off valve V4, and the on-off valve V4 may be omitted. In addition, when supplying the fluid to the process chamber 5, the pressure in the chamber and in the flow path downstream of the first valve V1 can be reduced by using a vacuum pump 6 connected to the process chamber 5.

Figure 2:
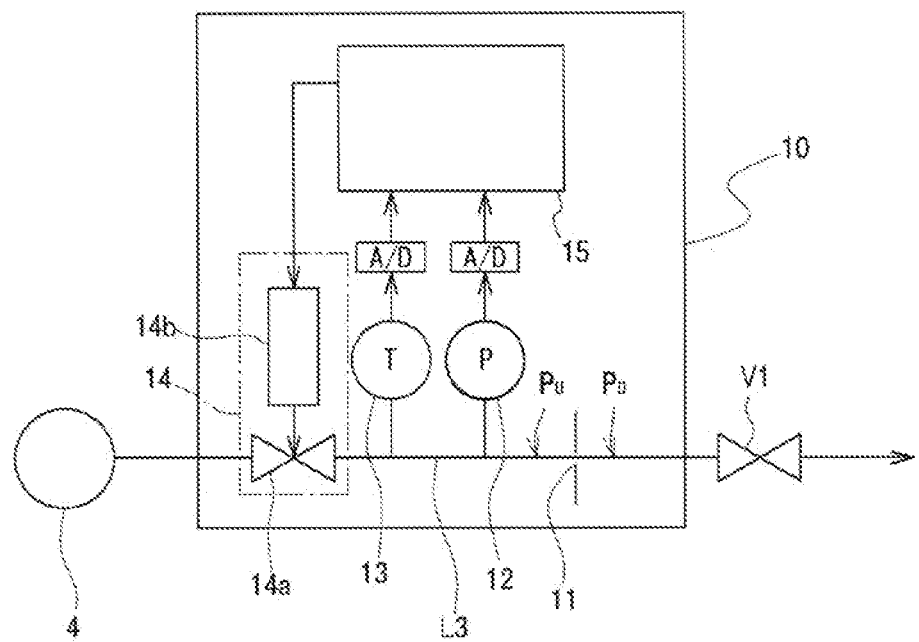
FIG. 2 is a schematic diagram showing an embodiment of a flow rate controller used in the flow rate control system.

The flow rate controller 10 is not particularly specified, but in the present embodiment, a known pressure type flow rate control device as shown in FIG. 2 is used. The pressure type flow rate control device (flow rate controller 10) includes a restriction part 11 (e.g., orifice plate) having a fine opening (orifice), a control valve 14 provided upstream of the restriction part 11, a pressure sensor 12 and a temperature sensor 13 provided between the restriction part 11 and the control valve 14. As the restriction part 11, a critical nozzle or a sonic nozzle may also be used instead of the orifice member. The aperture diameter of the orifice or the nozzle is set, for example, from 10 μm to 500 μm. The control valve 14 is consisted of a valve 14a and a drive unit 14b (e.g., a piezo actuator) of the valve 14a.

The pressure sensor 12 and the temperature sensor 13 are connected to a control circuit 15 via an AD converter. The control circuit 15 is also connected to the drive unit 14b of the control valve 14 to generate a control signal on the basis of outputs from the pressure sensor 12 and the temperature sensor 13 and control the operation of the control valve 14 by the control signal. In the present embodiment, the control circuit 15 is provided in one pressure type flow rate control device, however in other embodiments a common control circuit 15 may be provided outside for a plurality of pressure type flow rate control devices.

In the pressure type flow rate control device, the flow rate control is performed by utilizing the principle that: when the critical expansion condition $P_U/P_D \geq$ about 2 is satisfied (where $P_U$ is the gas pressure upstream of the restriction part or upstream pressure, $P_D$ is the gas pressure downstream of the restriction part or downstream pressure, and about 2 is in the case of nitrogen gas), the flow velocity of the gas passing through the restriction part 11 is fixed to the sound velocity, and the flow rate is determined by the upstream pressure $P_U$ regardless of the downstream pressure $P_D$. When the critical expansion condition is satisfied, the flow rate Q downstream of the restriction part is given by $Q=K_1 \cdot P_U$, where $K_1$ is a constant dependent on the fluid type and the fluid temperature, and the flow rate Q is proportional to the upstream pressure $P_U$. In addition, if it comprises a downstream pressure sensor and the difference between the upstream pressure $P_U$ and the downstream pressure $P_D$ is small, it is possible to calculate the flow rate even when the critical expansion condition is not satisfied. Based on the upstream pressure $P_U$ and downstream pressure $P_D$ measured by the pressure sensors, the flow rate Q can be calculated from a predetermined calculation formula $Q=K_2 \cdot P_D^m (P_U-P_D)^n$, where $K_2$ is a constant depending on the fluid type and fluid temperature, and m and n are indexes derived from the actual flow rate.

In order to perform flow rate control, the set flow rate is input to the control circuit 15, and the control circuit 15 obtains the flow rate by calculation from the above $Q=K_1 \cdot P_U$ or $Q=K_2 \cdot P_D^m (P_U-P_D)^n$ on the basis of the output of the pressure sensor 12 (upstream pressure $P_U$), and feedback-controls the control valve 14 so that the flow rate approaches the input set flow rate. The flow rate obtained by the calculation may be displayed on an external monitor as the flow rate output value.

Referring again to FIG. 1, in the flow rate control system 1 of the present embodiment, calibration of the flow rate measurement or the flow rate controller 10 is performed by opening the on-off valve V4, closing the on-off valve V5, and opening any one of the first valve V1 of interest. Thus, the flow rate measurement is performed by the build-up method, using the flow path between the first valves V1 and the second valve V2 (portion shown by a thick line in FIG. 1) as a reference capacity or build-up capacity. Then, the flow rate controller 10 is calibrated on the basis of the flow measurement result by the build-up method. Further, in the present embodiment, the third valve V3 provided in the flow rate measurement device 2 (the valve upstream of the pressure sensor) is maintained in an opening state at least during the flow rate measurement by the build-up method.

As the first valve V1, the second valve V2, and the third valve V3, although an on-off valve (shut-off valve) is suitably used, a valve having an adjustable opening degree may also be used. As the first valve V1, the second valve V2, the third valve V3, the on-off valve V4, and the on-off valve V5, for example, a fluid-operated valve such as an AOV (Air Operated Valve), or an electrically operated valve such as a solenoid valve, or a motor-driven valve may be used. The first valve V1 may also be an on-off valve incorporated in the flow rate controller 10.

After the flow rate controller 10 being incorporated into the flow rate control system 1, the flow rate control characteristics of the flow rate controller 10 may change, also the relationship between the upstream pressure and the flow rate may change due to the deformation of the restriction part caused by aging. In contrast, in the flow rate control system 1 of the present embodiment, using the flow rate measurement device 2, by the build-up method, the flow rate can be accurately measured at any timing even after the flow rate controller 10 being incorporated into the flow rate control system 1, thus the accuracy of the flow rate controller 10 can be ensured.

The flow rate measurement method by the flow rate control system 1 of the present embodiment will be described in detail. As described above, the flow rate control system 1 includes first valves V1 provided downstream of a flow rate controller 10; a flow rate measurement device 2 provided downstream of the first valves V1, the flow rate measurement device having a pressure sensor P, a temperature sensor T, and a second valve V2 provided downstream of the pressure sensor P and the temperature sensor T; and a control unit 3 for controlling the opening/closing of the first valves V1 and the second valve V2. As a first step, the system opens a first valve V1 and the second valve V2 to flow a gas, then closes the first valve V1 and the second valve V2 simultaneously at a timing of time t1 in a state where the gas is flowing, and then measures the pressure and temperature (a pressure value P1, a temperature value T1). Next, as a second step, the system opens the first valve V1 and the second valve V2 to flow the gas at a timing of time t2, then closes the second valve V2 at a timing of time t3 in a state where the gas is flowing, and then closes the first valve V1 at the timing of time t4 after a predetermined time Δt has elapsed, and measures the pressure and temperature (a pressure value P2, a temperature value T2) thereafter. Then, as a third step, the system calculates the flow rate based on the pressure value P1 and the temperature value T1 measured in the first step, the pressure value P2 and the temperature value T2 measured in the second step, and a build-up volume V determined by the pressure value P2 measured in the second step. That is, an arithmetic unit 33 of the control unit 3 calculates the flow rate Q based on the pressure values P1, P2, and the temperature values T1, T2, measured in the state of sealing 1 and sealing 2 of the time chart shown in FIG. 3(b), and a volume value V between the first valve V1 and the second valve V2 corresponding to the pressure value P2 stored in a storage unit 32. The calculated flow rate Q is displayed on a display device 34. The flow rate Q is obtained by, for example, Q=22.4×V×(P2/T2−P1/T1)/(760×R·Δt), where V is a build-up capacity determined corresponding to the pressure value P2, R is a gas constant, Δt is a predetermined time from closing the second valve V2 until closing the first valve V1 (build-up time) in the second step. Moreover, the above formula corresponds to the formula when the pressure value P1 and P2 are given in units Torr.

The value of the volume from the first valve V1 to the second valve V2 stored in the storage unit 32 varies depending on the gas supply line L1, for example, it has a strong linear relationship with respect to the pressure in the volume as shown in FIG. 4. This relational expression, typically an approximate linear function, is stored in the storage unit 32, and the value of the volume is uniquely determined in accordance with the measured pressure value P2. In addition, according to an experiment conducted by the inventors, it was found that this value changed somewhat depending on the temperature. Although it is a small effect compared to the pressure change, when a flow rate calculation with higher accuracy is required, the volume value V in consideration of the temperature value T2 as well as the pressure value P2 may be used. In this case, besides using a graph of the temperature closest to the measured temperature value T2, it can also be configured, for example, to correct the volume value V using a correction coefficient based on a difference between a reference temperature and the measured temperature which has been stored in advance in the storage unit 32, in respect to the volume value V (the value obtained from the pressure value P2) at a reference temperature (e.g. 30° C.). In addition, although the embodiment, in which the relational expression between the pressure value P2 and the volume value V is stored in advance, has been described above, the invention is not limited thereto, and a table describing the relationship between a plurality of pressure values P2 and the corresponding volume values V may be stored in the storage unit 32, and the volume value V may be determined using this table.

The reason why the volume value V varies in correspondence with the build-up pressure (pressure value P2) is considered to be because that, as described above, the space volume within the pressure sensor connected to the flow path varies due to the deformation of the diaphragm in the pressure sensor by a magnitude of the applied pressure corresponding to the build-up pressure, or due to the occurrence of the internal deflection in a pressure sensor of strain gauge type. In this case, the relationship formula between the build-up pressure and the volume value V described above may be different depending on the configuration, size, installation number, etc. of the pressure sensor. For this reason, in an actual embodiment, it is preferable to select an appropriate relational formula in accordance with the mode of the pressure sensor provided in the flow rate control system and to appropriately determine the volume value V in the system. Further, as the pressure sensor used in the present embodiment, for example, those of the type incorporating a silicon single crystal sensor chip, which has a diaphragm to form a pressure sensing surface, may be used.

The flow rate measurement using the flow rate measurement device 2 of the present invention can be performed at various timings, in addition to the timing of installing an apparatus, it can be performed at other timings, such as periodic inspection, inspection corresponding to the usage time, when the used fluid changes, etc. and the accuracy of the flow rate controller 10 can be maintained.

In addition, the embodiment, in which the step of measuring the pressure value P2 and the temperature value T2 of the gas after build-up (second step) is performed after the step of measuring the pressure value P1 and the temperature value T1 after closing the first valve V1 and the second valve V2 simultaneously (first step), has been described, but it is not limited thereto. The order of performing the first step and the second step may be reversed. However, in the first step and the second step, it is preferable that the pressure corresponding to the set flow rate at the start is the same. If after performing the first step and the second step regardless of the order, the step of calculating the flow rate using the pressure values P1, P2, the temperature values T1, T2, and further, a volume value V determined on the basis of the pressure value P2 (third step) can be performed.

Embodiment 2

The embodiment 2 is a flow rate control system according to the present invention, and the configuration of the device is the same as that of the first embodiment, so a detailed description thereof is omitted. Also in the second embodiment, when the flow rate is measured in the flow rate control system 1 shown in FIG. 1, the on-off valve V4 is opened and the on-off valve V5 is closed.

In the flow rate control system of the second embodiment, sealing processes from the sealing 1 to the sealing 4 of the time chart shown in FIG. 3(b) are performed, and the pressure values P3, P4, the temperature values T3, T4 are measured in a state of the sealing 3 and the sealing 4. Specifically, the flow rate is calculated in consideration of the third pressure value P3 and the third temperature value T3, which are measured after measuring the second pressure value P2 and the second temperature value T2, while opening the second valve V2 for a shorter time than the predetermined time in a state where the first valve V1 is closed, closing the third valve V3 immediately before the opening or at the same time of opening of the second valve V2, and the fourth pressure value P4 and the fourth temperature value T4, which are measured after opening the third valve V3 thereafter. By measuring and calculating the pressures and temperatures in the sealing 3 and the sealing 4, the molar number can be corrected by the partial pressure method, and the influence of the piping temperature and the like from the first valve V1 to the third valve V3 can be suppressed. Moreover, the third valve V3, as shown in FIGS. 1 and 3(a), is a valve interposed in the flow path between the first valve V1 and the second valve V2, typically provided upstream of the pressure sensor P and temperature sensor T built in the flow rate measurement device 2. If both the second valve V2 and the third valve are built in the flow rate measurement device 2, an advantage of easy and accurate determination of the flow path volume between the second valve V2 and the third valve can be obtained.

Also in the flow rate control system 1 of the present embodiment, depending on the difference in the flow rate from the flow rate controller 10, it is possible to change the pressure value P2 in the state of the sealing 2, which serves as the build-up pressure. Also in this case, by previously recording in the storage unit 32 the relationship between the volume value V and the pressure value P2, e.g., a value (relational expression) that varies in a linear relationship shown in FIG. 4, it is possible to obtain an appropriate volume value V in correspondence with the pressure value P2. Therefore, it does not affect the calculation results even if the pressure value P2, which serves as the build-up pressure, is changed.

Figure 3:
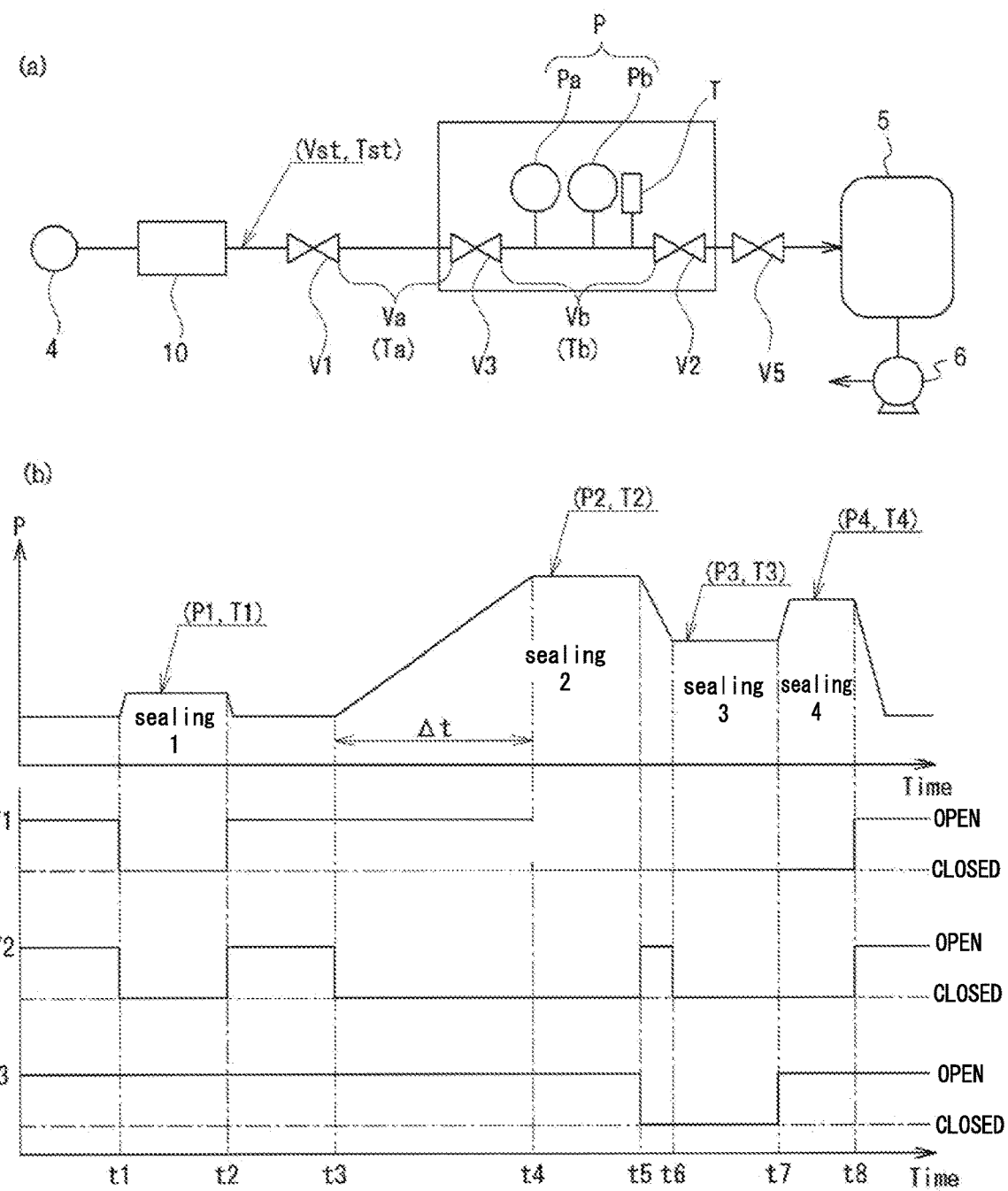
FIG. 3 shows an outline of the flow rate control system and the flow rate measurement method according to an embodiment of the present invention, where (a) is a schematic diagram of simplified one system corresponding to FIG. 1, and (b) is a timing chart of the measurement method.

Considering the volume in the pipe connecting the first valve V1 and the third valve V3 as Va, and the volume in the pipe connecting the second valve V2 and the third valve V3 as Vb (see FIG. 3 (a)), the calculation formula by performing the sealing 3 and the sealing 4, which are performed in order to suppress the influence of the pipe temperature and the like, will be described below.

After the sealing 2, by closing the third valve V3 while opening and then closing the second valve V2 for a short time, the pressure between the second valve V2 and the third valve V3 decreases from P2 to P3. However, in the sealing 3, the pressure value P2 becomes the pressure value P3 only in the pipe connecting the second valve V2 and the third valve V3, the pressure in the pipe connecting the first valve V1 and the third valve V3 is maintained at the pressure value P2. Then, in the sealing 4, by opening the third valve V3, the pressure in the pipe connecting the first valve V1 and the second valve V2 becomes uniformly the pressure value P4. Further, in the sealing 3 and the sealing 4, since both the first valve V1 and the second valve V2 are maintained in a closed state, the amount of substance of the gas between the first valve V1 and the second valve V2 is maintained constant.

This relationship is expressed by the combined gas law or Boyle-Charle's law as $(P2 \cdot Va)/Ta + (P3 \cdot Vb)/T3 = (P4 \cdot Va)/Ta + (P4 \cdot Vb)/T4$, where Ta is the value of the temperature in the pipe connecting the first valve V1 and the third valve V3. Since T3 T4, the calculation is performed as Tb T3 T4 in the following formula.

By deleting Va and Ta, which are difficult to measure, from the general build-up formula and the above formula, then $Q = 22.4 \times ((P2-P1)/(760 \times R \times \Delta t)) \times (Vb/Tb \times (P2-P3)/(P2-P4) + Vst/Tst)$ is derived. Vst and Tst are the volume and temperature from the flow rate controller 10 to a valve element of the first valve V1. Tst is substituted by Tb because it an on-circuit thermometer is not provided. Although constant values are conventionally used for Vb and Vst when calculating a flow rate by this formula, in the flow rate control system 1 and the flow rate measurement method of the second embodiment, the accurate flow rate is calculated by using the value of Vb corresponding to the P2, which is the build-up pressure. Compared to the first embodiment, the value of the volume related to the calculation formula is only Vb in the present embodiment, that is, only the volume between the second valve V2 and the third valve V3, this volume is the volume in the internal pipe of the flow rate measurement device 2, and is small in this embodiment. In contrast, the ratio of the volume change due to the diaphragm deformation of the two pressure sensors Pa and Pb used in the present embodiment becomes maximum 0.8% as shown in FIG. 4, which has a large effect, so the correctability of the error in calculation becomes larger than that in the first embodiment.

INDUSTRIAL APPLICABILITY

As described above, since the flow rate control system and the flow measurement method of the present invention can accurately calculate the flow rate even if changing the build-up pressure when changing the flow rate of the measured fluid, it can be suitably used in applications of flow rate calibration in the thermal mass flow rate controller, in addition to the pressure type flow rate controller.

DESCRIPTION OF NUMERALS

1 Flow rate control system
10 Flow rate controller
11 Restriction part
12 Pressure sensor
13 Temperature sensor
14 Control valve
15 Control circuit
2 Flow rate measurement device
3 Control unit
31 Recording unit
32 Storage unit
33 Arithmetic unit
34 Display part
4 Gas supply source
5 Chamber
6 Vacuum pump
P Pressure sensor
T Temperature sensor
V1 First valve
V2 Second valve
P1 First pressure value
T1 First temperature value P2 Second pressure value
T2 Second temperature value
Δt Predetermined time
V Volume value

The invention claimed is:

1. A flow rate control system comprising:
a downstream flow path of a flow rate controller;
a first valve provided to the downstream flow path of the flow rate controller;
a downstream flow path of the first valve;
a flow rate measurement device provided to the downstream flow path of the first valve, the flow rate measurement device having a pressure sensor, a temperature sensor, and a second valve provided to a downstream flow path of both sensors; and
a control unit for controlling an opening/closing operation of the first valve and the second valve,
wherein the control unit includes:
a recording unit for recording the measured values of the pressure sensor and the temperature sensor;
a storage unit for storing a volume value of a fluid between the first valve and the second valve corresponding to the measured value of the pressure sensor; and
an arithmetic unit for calculating a flow rate, and
wherein the arithmetic unit is configured to calculate the flow rate based on:
a first pressure value and a first temperature value measured after opening the first valve and the second valve to flow gas from the flow rate controller to a downstream flow path of the flow rate measurement device and then closing the first valve and the second valve simultaneously in a state where the gas is flowing;
a second pressure value and a second temperature value measured after opening the first valve and the second valve to flow the gas, closing the second valve in a state where the gas is flowing, and then closing the first valve after a predetermined time period has elapsed; and
the volume value of the fluid between the first valve and the second valve corresponding to the measured second pressure value obtained from the storage unit.

2. The flow rate control system according to claim 1 further comprising a third valve provided to a flow path between the first valve and the second valve,
wherein the arithmetic unit is configured to calculate the flow rate based on a third pressure value, a third temperature value, a fourth pressure value, and a fourth temperature value in addition to the first pressure value, the first temperature value, the second pressure value, and the second temperature value,
wherein the third pressure value and the third temperature value are measured after measuring the second pressure value and the second temperature value while the first valve and the second valve are closed and the third valve is open, and then closing the third valve simultaneously with or immediately before opening the second valve in which the second valve is opened for a shorter time than the predetermined time period and then closed while the first valve is kept closed, and
wherein the fourth pressure value and the fourth temperature value are measured after measuring the third pressure value and the third temperature value, and then opening the third valve while the first valve and the second valve are kept closed.

3. The flow rate control system according to claim 1, wherein the arithmetic unit is configured to calculate the flow rate according to the equation that $Q=22.4*V*(P2/T2-P1/T1)/(760*R*\Delta t)$, where Q is a flow rate, V is the volume value of the fluid between the first valve and the second valve corresponding to the measured second pressure value, P1 is the first pressure value, T1 is the first temperature value, P2 is the second pressure value, T2 is the second temperature value, R is a gas constant, and Δt is the predetermined time period.

4. The flow rate control system according to claim 2, wherein the arithmetic unit is configured to calculate the flow rate according to the equation that $Q=22.4*((P2-P1)/(760*R*\Delta t))*(Vb/Tb*(P2-P3)/(P2-P4)+Vst/Tst)$, where Q is a flow rate, P1 is the first pressure value, P2 is the second pressure value, P3 is the third pressure value, P4 is the fourth pressure value, R is a gas constant, and Δt is the predetermined time period, Vb is a volume value of the fluid between the third valve and the second valve, Vst is a volume value of the fluid between the flow rate controller and the first valve, and Tb and Tst are temperature values corresponding to the third temperature value or the fourth temperature value.

5. A flow rate measurement method performed in a flow rate control system comprising: a downstream flow path of a flow rate controller, a first valve provided to the downstream flow path of the flow rate controller, a downstream flow path of the first valve, a flow rate measurement device provided to the downstream flow path of the first valve, the flow rate measurement device having a pressure sensor, a temperature sensor, and a second valve provided to a downstream flow path of both sensors; and a control unit for controlling the opening/closing operation of the first valve and the second valve,
the flow rate measurement method comprising:
a first step of opening the first valve and the second valve to flow a gas from the flow rate controller to a downstream flow path of the flow rate measurement device, then closing the first and second valves simultaneously in a state where the gas is flowing, and measuring a pressure and a temperature thereafter;
a second step of opening the first valve and the second valve to flow a gas from the flow rate controller to a downstream flow path of the flow rate measurement device, then closing the second valve in a state where the gas is flowing, then closing the first valve after a predetermined time period has elapsed, and measuring a pressure and a temperature thereafter; and
a third step of calculating a flow rate on the basis of the pressure and temperature measured in the first step, the pressure and temperature measured in the second step, and a volume value of a fluid between the first valve and the second valve that varies corresponding to the pressure measured in the second step.

6. The flow rate measurement method according to claim 5,
wherein the flow rate control system further comprises a third valve provided downstream of the flow rate controller and the first valve, but upstream of the pressure sensor and the temperature sensor, the first step and the second step being merely performed while the third valve is open, and
wherein after pressure measurement and temperature measurement of the second step, a pressure measured after opening and then closing the second valve in a short time while closing the third valve and a pressure further measured after opening the third valve in a state where the second valve is kept closed are used for the flow rate calculation of the third step.

7. The flow rate measurement method according to claim 5, wherein the third step of calculating the flow rate comprises a step of calculating the flow rate according to the equation that $Q=22.4*V*(P2/T2-P1/T1)/(760*R*\Delta t)$, where Q is a flow rate, V is the volume value of the fluid between the first valve and the second valve, P1 is a pressure value measured in the first step, T1 is a temperature value measured in the first step, P2 is a pressure value measured in the second step, T2 is a temperature value measured in the second step, R is a gas constant, and $\Delta t$ is the predetermined time period in the second step.

8. The flow rate measurement method according to claim 6, wherein the third step of calculating the flow rate comprises a step of calculating the flow rate according to the equation that $Q=22.4*((P2-P1)/(760*R*\Delta t)*(Vb/Tb*(P2-P3)/(P2-P4)+Vst/Tst)$, where Q is a flow rate, P1 is a pressure value measured in the first step, P2 is a pressure value measured in the second step, P3 is a pressure value measured after opening and then closing the second valve in a short time while closing the third valve after the second step, P4 is a pressure value measured after opening the third valve in a state where the second valve is kept closed after the second step, R is a gas constant, and $\Delta t$ is the predetermined time period in the second step, Vb is a volume value of the fluid between the third valve and the second valve, Vst is a volume value of the fluid between the flow rate controller and the first valve, and Tb and Tst are temperature values measured after opening and then closing the second valve in a short time while closing the third valve after the second step.

* * * * *